(12) United States Patent
Maestro Garcia et al.

(10) Patent No.: US 11,449,283 B1
(45) Date of Patent: Sep. 20, 2022

(54) HYBRID-MASKED HALFTONE AREA NEUGEBAUER SEPARATION (HANS) PIPELINE

(71) Applicant: Hewlett-Packard Development Company, L.P., Spring, TX (US)

(72) Inventors: Javier Maestro Garcia, Sant Cugat del Valles (ES); Pau Costal Fornells, Sant Cugat del Valles (ES); Sergio Etchebehere Juan, Sant Cugat del Valles (ES); Pere Josep Canti Nicolas, Sant Cugat del Valles (ES); Jan Morovic, London (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/514,809

(22) Filed: Oct. 29, 2021

(51) Int. Cl.
*G06F 3/12* (2006.01)
*H04N 1/52* (2006.01)
*G06K 15/10* (2006.01)

(52) U.S. Cl.
CPC .......... *G06F 3/1208* (2013.01); *G06F 3/1219* (2013.01); *G06F 3/1275* (2013.01); *G06K 15/102* (2013.01); *H04N 1/52* (2013.01)

(58) Field of Classification Search
CPC .... G06F 3/1208; G06F 3/1219; G06F 3/1275; G06K 15/102; H04N 1/52
See application file for complete search history.

(56) References Cited

U.S. PATENT DOCUMENTS

| | | | |
|---|---|---|---|
| 10,542,185 B2 * | 1/2020 | Morovic | H04N 1/4057 |
| 2016/0255240 A1 * | 9/2016 | Morovic | H04N 1/4053 358/3.07 |

OTHER PUBLICATIONS

Morovic et al., "HANS—Controlling Inkjet Print Attributes via Neugebauer Primary Area Coverages", IEEE Transactions on Image Processing, Aug. 2011.

Morovic et al., "HANS—A New Color Separation and Halftoning Paradigm", IS&T/SID 18th Color Imaging Conference, Nov. 2010.

\* cited by examiner

*Primary Examiner* — Quang N Vo
(74) *Attorney, Agent, or Firm* — Michael A. Dryja

(57) ABSTRACT

A hybrid-masked halftone area Neugebauer separation (HANS) pipeline for a printing system is constructed. A number of Neugebauer Primaries (NPs) of and a halftone pattern to employ within the pipeline are selected according to specified ink interaction constraints during printing system ink output onto media, at a native resolution of the printing system. An NP area coverage (NPac)-based lookup table (LUT) and a pre-LUT color profile to employ within the pipeline are constructed according to first specified ink coverage and usage constraints during the ink output, at the native resolution. LUT post-processing and post-halftone pattern masking to employ within the pipeline are determined according to second specified ink coverage and usage constraints during the ink output, at the native resolution.

15 Claims, 3 Drawing Sheets

HYBRID-MASKED HALFTONE AREA NEUGEBAUER SEPARATION (HANS) PIPELINE

BACKGROUND

Print is the result of a number of colorants, such as inks, of different colors being superimposed on a substrate, such as a sheet of media like paper. Since most printing technologies permit just for a small number of levels of ink to be deposited at a given location on a substrate, halftoning is used to obtain ink patterns that result in a given color when seen from a suitable viewing distance. These halftone patterns also result in inks being deposited on top of or next to one another in a specific manner, realizing a color that relates non-linearly to the amounts of the inks used.

DETAILED DESCRIPTION

Figure 1:
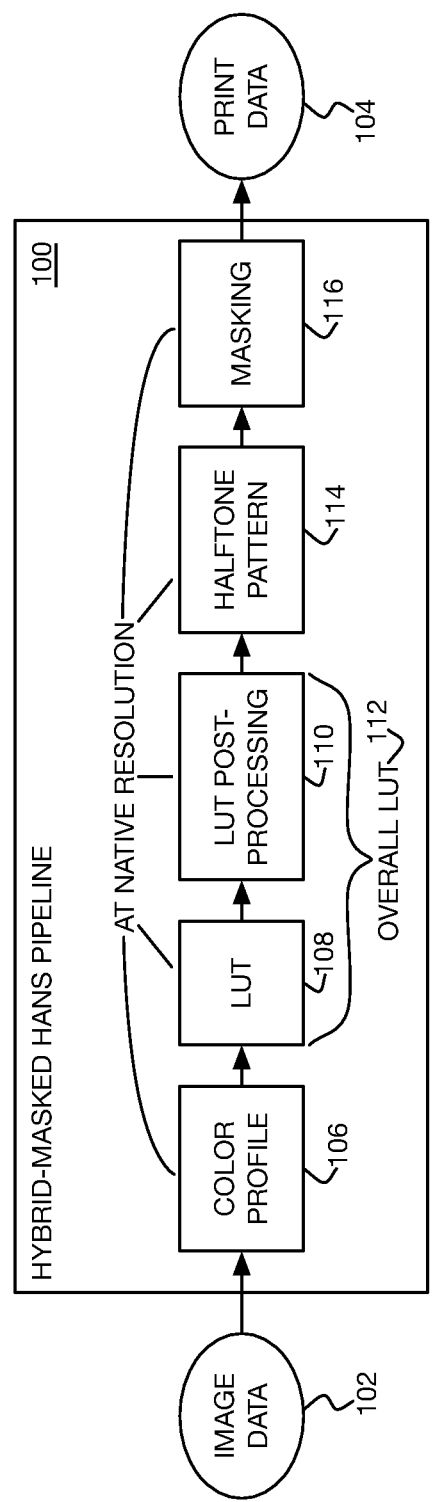
FIG. 1 is a diagram of an example hybrid-masked halftone area Neugebauer separation (HANS) pipeline that can be employed to generate print data for an image from image data of the image, in accordance with which ink can be output onto media to print the image on the media.

As noted in the background, halftoning can be used to obtain ink patterns that result in a given color when seen from an appropriate viewing distance. How much of an ink to use is the result of color separation, where ink amounts are chosen for each printable color. This is preceded by color management, where a choice of color reproduction objective (e.g., accuracy or aesthetics) can be made. Differences between the color gamuts of the image data of the image to be printed and the printing system that is to print the image according to corresponding print data can also be dealt with during color management, where a color characterization of the printing system is employed with the aim of accurately rendering the chosen color reproduction objective.

One approach to print color provides for color separation that has access to all printable patterns and spans the Neugebauer primary (NP) area coverage (NPac) space. This approach is referred to as halftone area Neugebauer separation (HANS). In this approach, the restriction of an ink space is removed, and access to all NPs (as many or as few as needed) is available at each pixel. Access is thus given to a greater variety of print level attributes, realizing more accurate color reproduction.

A color of a halftone pattern is the convex combination of colors, such as colors defined in the CIE XYZ, CIE 1931, or CIE LAB color space, of the NPs used in the color in question. An NP is one of a possible number of ink overprints, with its convex weight being the relative area covered by the NP. That is, an NP defines an overprint of different amounts of a specified number of colorants, such as the colorants available to the printing system (e.g., cyan, magenta, yellow, and black). An NP may also be referred to as a device or drop state, since at any single halftone pixel just one NP can be employed.

A particular color is specified within the NPac space as an NP vector, made up of a combination of NPs, such as four NPs, where as used herein an NP vector is not to be confused with individual NPs that may themselves be vectors. For example, for a two-dimensional color space having two inks and binary ink levels or states (ink or no ink), an NPac vector is made of four NPs: white (W), which is the blank substrate, cyan (C), magenta (M), and the CM overprint. If more than two levels of ink can be specified at each halftone pixel, then the resultant color space is of higher dimensionality still. An NP vector may also be referred to as an NPac. Thus, an NP vector or NPac is made up of NPs, which each define an overprint of up to all the available colors of colorant at up to the highest level or state possible that can be output.

While employing HANS provides for improved color fidelity when using a printing system to output inks of different color onto media to print an image, printing on a broad and unknown-in-advance variety of substrates can be difficult. The interaction between inks and substrates is complex, necessitating careful balancing that can lead to challenges in reaching high degrees of image quality at the desired throughout. For example, ink-substrate interactions can result in objectionable artifacts in the form of banding, such as dark-light zone banding (DLZB).

A main cause of these and other types of artifacts often relates to how inks interact with the substrate, whether the substrate has other inks or fluids already applied to it, and the timing and sequence of these inks. Some inks, such as black (K) ink due to its density, are particularly sensitive to these interactions, for instance. As a result, unwanted small-scale features corresponding to artifacts like banding, mottling, puddling, and so on, can occur, decreasing overall image uniformity and quality.

Techniques to address these issues have heretofore generally been limited to those that trade off print speed for image quality. For example, unidirectional printing may be employed instead of bidirectional printing, to mitigate ink-order and ink-media timing variation, but with a resultant decrease in throughput. As another example, a large number of passes, such as twelve or more, may be performed over each media swath to result in acceptable image quality, but again with a large decrease in throughput. High image quality with few or no artifacts at relatively fast print speeds, such as bidirectional printing with as few as six or eight passes, has heretofore not been possible.

Techniques described herein ameliorate these issues, permitting fast print speeds without sacrificing image quality and limiting the number of artifacts. The techniques described herein employ a hybrid-masked HANS pipeline at the native print resolution of the printing system being employed. The HANS pipeline is a hybrid-masked pipeline insofar as an NPac-based lookup table (LUT) that is employed can have different NPs map to different masking strategies as well as to different masks. Rather than applying the pipeline at image resolution, the pipeline is applied at the native print resolution so as to have a pixel-to-pixel correspondence between halftone and mask and in order to maximally compensate for ink-substrate interactions.

The techniques provide for a combination of choices in construction of the hybrid-masked HANS pipeline that in concert provide a high level of performance for the highest image quality print modes of a printing system. The choices can be individually tuned for different print modes, substrates, ink sets, and printing systems to adapt to specified constraints and interactions. For example, custom resources that favor light or dark inks and that reduce or maximum the amount of black ink can be constructed, and custom NPacs for each color LUT node can be used that are composed of different NPs mapping to different specific masking strategies and different specific masks.

FIG. 1 shows an example hybrid-masked HANS pipeline 100. Image data 102 for an image is input into the pipeline 100, and corresponding print data 104 for the image is output from the pipeline 100. Stated another way, the pipeline 100 is applied to the image data 102 to generate the print data 104. A printing system then outputs ink onto media according to the print data 104 to print the image.

The image data 102 is made up of individual pixels that each have color values for each primary color of the image color space. For example, in a CMYK color space, each pixel has a C value, a M value, a Y value, and a K value. (The techniques described herein can be employed in relation to other color spaces as well, such as the red, green, and blue (RGB) color space, in which each pixel has a red (R) value, a green (G) value, and a blue (B) value.) In the example, the resolution of the image data 102 is at the native resolution of the printing system that will be used to print the image. If the image data 102 is not at this resolution, then the image data 102 is first converted to the resolution.

This is because the hybrid-masked HANS pipeline 100 processes the image data 102 at the native resolution of the printing system. The native resolution of the printing system is the highest resolution, such as 600-by-1,200 dots per inch (dpi), that the inkjet printheads of the system actually output droplets of ink. This is unlike existing pipelines, which often operate at a lower resolution than native resolution, such as 600×600 dpi, operating the pipeline 100 at the native resolution of the printing system.

A color profile 106 of the hybrid-masked HANS pipeline 100 is first applied to the image data 102, yielding corrected image data 102. The color profile 106 is a pre-LUT color profile in that it is applied before a LUT 108 is applied. The color profile 106 may be an International Color Consortium (ICC) color profile. The LUT 108 is then applied to the corrected image data 102, resulting in NP vectors at the native resolution. The LUT 108 is an NPac-based LUT, in that the LUT 108 maps colors to NP vectors, or NPacs, with each color mapped to a corresponding NP vector. The number of NPs that are used in the LUT 108 may be much smaller than in existing HANS pipelines. For example, as few as 100 NPs may be employed to decrease ink interactions without sacrificing grain.

LUT post-processing 110 of the hybrid-masked HANS pipeline 100 is applied to the NP vectors, resulting in post-processed NP vectors at the native resolution. The LUT post-processing 110 can provide for different NPs used for different colors, according to thresholds corresponding to ink coverage. The initial NPac-based LUT 108 and the LUT post-processing 110 together can be considered as an overall LUT 112 of the pipeline 100. Each color is thus mapped by the overall LUT 112 to a corresponding post-processed NP vector.

A halftone pattern 114 of the hybrid-masked HANS pipeline 100 is applied to the post-processed NP vectors, resulting in halftones. As one example, the halftone pattern 114 may be a blue-noise pattern, but more generally is selected to satisfy specified ink interaction constraints. A masking 116 of the pipeline 100 is applied to the halftones, resulting in masked, halftoned, and post-processed NP vectors at the native resolution that constitute the print data 104 when the halftone pattern 114 is applied. The masking 116 is applied after the masking is applied, and to that extent can be referred to as a post-halftone pattern masking. The masking 116 can define different masking ramps for different NPs according to the same thresholds corresponding to ink coverage used in the LUT post-processing 110.

Figure 2:
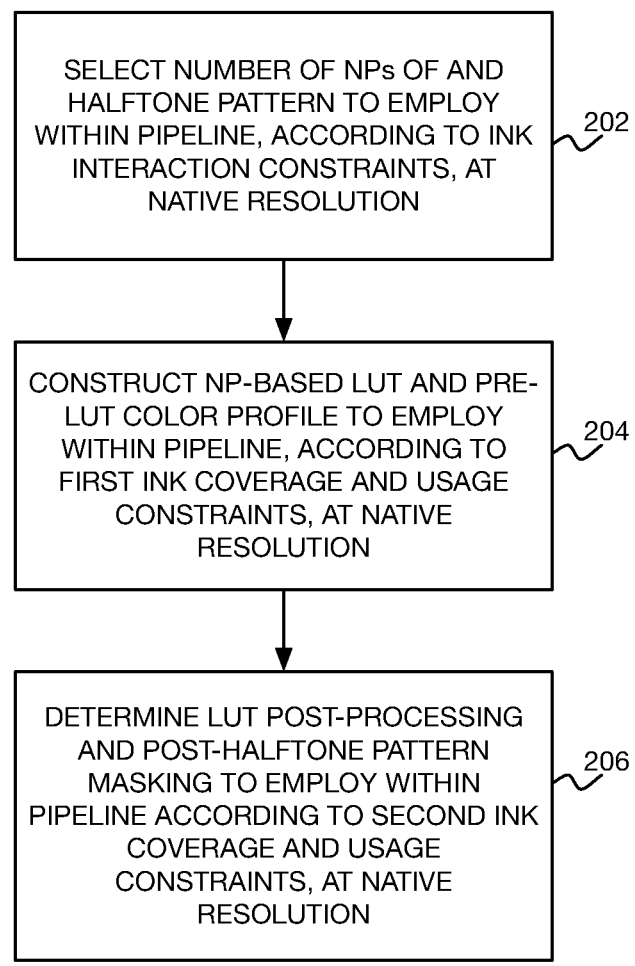
FIG. 2 is a flowchart of an example method for constructing the HANS pipeline of FIG. 1.

FIG. 2 shows an example method 200 for constructing the hybrid-masked HANS pipeline 100 for a printing system having a native resolution. The method 200 includes selecting the number of NPs and the halftone pattern 114 to employ within the pipeline 100 according to specified ink interaction constraints during printing system ink output onto media, at the native resolution of the printing system (202). In one implementation, the specified ink interactions may be to reduce the number of ink interactions, without sacrificing grain of the image to be formed on the media. Image grain relates to the relative contrast of colors or colorants in smaller local areas of a printed image. If image grain is sacrificed, the colors or colorants in such smaller local areas are more easily identified such that the resulting image appears grainy.

In this implementation, as to the number of NPs, the complexity of ink interactions can be reduced from more than 500 that is obtained when using ink vector-based error-diffusion halftoning in which combinations of inks are not directly lowered and where random combinations have non-zero probabilities in principle. The number of such ink interactions can be reduced to about 50 for a 110% density print mode with targeted and selective use of NPs in the hybrid-masked HANS pipeline 100. For example, the number of NPs can be reduced to about 50 NPs, in satisfaction of the specified ink interaction constraints in order to provide for such a reduction in ink interactions. As to the halftone pattern 114, a highly dispersed pattern, such as a blue-noise pattern, can be selected to further spread out the drop states, and thus in satisfaction of the specified ink interaction constraints in order to further minimize the number of ink interactions.

The native resolution for the halftone pattern 114, such as 600×1,200 dpi, is used, instead of halftoning at a more common, lower resolution, such as 600×600 dpi, and repeating and removing pixels to obtain a native, asymmetrical resolution. This is because for error-diffusion halftoning to be performed at higher (e.g., native) resolution, additional throughput constraints are imposed. That is, per-pixel control is ensured via having the hybrid-masked HANS pipeline 100 operate at the native resolution of the printing system.

The method 200 includes then constructing the NPac-based LUT 108 and the pre-LUT color profile 106 to employ within the hybrid-masked HANS pipeline 100, according to what are referred to as first specified ink coverage and usage constraints during printing system ink output at the native resolution (204). In one implementation, the first specified ink coverage and usage constraints can be to favor lighter inks over darker inks to increase ink coverage and to favor composite inks over back (K) ink (e.g., printing a combination of C, M, and yellow (Y) ink to achieve K instead of printing K ink) to increase the ink coverage. Favoring lighter inks over darker inks increases coverage, since more ink is used to realize a given color. Similarly, achieving black using composite ink instead of K ink uses more ink to realize darker colors. Increasing ink coverage can provide for better and more uniform interaction with any pretreatment fluid that may be output on the media prior to ink deposition.

As used herein, light or lighter inks are lower pigment load versions of normal, dark, or darker inks. Similarly, dark or darker inks are higher pigment load versions of light or lighter inks. For example, in a six-colorant, CcMmYK printing system, there are regular or dark cyan (C) and magenta (M) inks, and light or lighter cyan (c) and magenta (m) inks. The c and m inks have lower pigment loads than their C and M counterparts.

In one implementation, therefore, the LUT 108 is constructed to maximize light ink usage, which is counter to existing LUT construction in which light inks are used just when lower densities of composite C and M ramps are needed. Thus, the LUT 108 is constructed to maximize light C and light M over dark C and dark M in satisfaction of the first specified ink coverage and usage constraints in order to favor lighter inks over darker inks to increase ink coverage. The LUT 108 is further constructed to use just the reduced number of NPs selected in part 202. The color profile 106 is similarly constructed to favor composite inks over K ink in satisfaction of the first specified ink coverage. For example, the color profile 106 can be constructed with a k-minimizing but gamut-preserving technique, such that the maximum amount of K is replaced with combinations of C, M, and Y that result in a gamut with a specified threshold of the maximum gamut.

The method 200 includes finally determining the LUT post-processing 110 and the post-halftone pattern masking 116 to employ within the hybrid-masked HANS pipeline 100, according to what are referred to as second specified ink coverage and usage constraints during printing system ink output at the native resolution (206). In one implementation, the second specified ink coverage and usage constraints can be using custom NPacs for colors realized with lower ink densities at lower ink coverage and using smoother masking ramps at lower ink coverage. Therefore, colors realized with lower ink densities have different NPs than colors realized with higher ink densities, and the resulting NPs can have lower ink coverage than they otherwise would have, which also permits different (e.g., smoother) masking ramps to be employed.

A color realized with a lower ink density is a color that is realized with a lower amount of ink as compared to a color realized with a higher ink density and thus with a higher amount of ink. Similarly, a color realized with a higher ink density is a color that is realized with a higher amount of ink as compared to a color realized with a lower ink density and thus with a lower amount of ink. For instance, in one implementation, when up to 0.2 drops of ink is used to achieve a color, the color may be considered as having a lower ink density, whereas when more than 0.2 drops of ink is used to achieve the color, the color may be considered as having a higher ink density.

A smooth or smoother masking ramp as used herein means a ramp shape that has a lower gradient, such as a gradient less than a specified threshold. A low amplitude sinusoidal ramp, for instance, may be considered a smooth or smoother masking ramp, whereas a ramp that has a sharp linear transition is not. In a smooth or smoother masking ramp, then, the laying down of ink is more gradual, such that the needed density is built up more slowly. This is acceptable for low densities of ink when compensated with other, existing ramps for higher densities of ink.

Satisfying the constraints of this implementation can improve image quality. Ink usage is differentially controlled on a per-pixel basis according to how the resulting pixels will be printed based on their colors. The result of the determined LUT post-processing 110 and the determined post-halftone pattern masking 116 is thus a hybrid-masked approach, in which in the overall LUT 112 there are hybrid NPacs that contain two or more types of NPs, with corresponding different masks in the masking 116.

In this implementation, the LUT post-processing 110 is determined by defining different NPs for the colors realized with lower ink densities according to a threshold corresponding to lower ink coverage. Specifically, each node of the LUT 108 can be post-processed within the LUT post-processing 110 as follows. If the total amount of ink is less than or equal to a threshold number of drops, such as 0.2 drops as noted above—which is a threshold corresponding to lower ink amounts—then just one-drop NP states are used, which are subsequently interpreted as one type of masking. By comparison, if the total ink amount is greater than the threshold number of drops, just two- and three-drop states are used. However, these two- and three-drop states are subsequently reinterpreted as one- and two-drop states that are masked differently. (That is, for example, two- and three-drop states does not mean that two drops are used, but rather they are masked differently than one-drop states.) As such, these choices can be made on a per-node basis, for particular CMYK contone or the presence or absence of particular colorants, as opposed to a global strategy controlling all the nodes.

Similarly, the post-halftone pattern masking 110 is determined by defining smoother masking ramps for the different NPs defined for the lower ink-density colors in the LUT post-processing according to the threshold corresponding to lower ink amounts. Lower ink amounts (i.e., up to the threshold number of drops) can be masked using a profile that is smoother in its ramps. Since this is a low amount of ink, such smooth ramps are feasible, and result in a more gradual layering of pretreatment and ink colors. Higher ink amounts (e.g., above the threshold number of drops) can be masked using less smooth masking techniques that are more commonly employed, such as a trapezoid ramp profile, which has a more abrupt ramp-to-plateau transition but is better distributed for firing frequency uniformity, which is more important when larger amounts of ink are printed.

The method 200 therefore constructs the hybrid-masked HANS pipeline 100 in a way that satisfies specified ink interaction constraints, and first and second specified ink coverage and usage constraints. The constraints are selected to provide a corresponding specified image quality of an image printed on media via ink output onto the media by the printing system. Specific choices are made to obtain the best performance of a given printing system, having a specified carriage layout, specified drying and curing performance, and so on. Each component of the pipeline 100 can be tuned for different systems with different constraints. For example, if light inks result in worse interactions than K ink, the opposite strategy to the implementation described above could be used: minimizing light ink usage and maximizing K ink usage.

The method 200 provides for close coordination of the components of the hybrid-masked HANS pipeline 100 during construction. The interplay and mutual tuning of the components, rather than the effects of any individual component, provide for overall image quality performance. In the described implementation, a single color, such as a light gray, can be made up of passes that use the masks best suited for lower amounts of ink, while complementing those with existing types of masks for the remaining amount. That is, lower densities of some color shades are printed just with the smoother ramp masks, whereas higher densities of the same shades may be partially printed with the smoother ramps and complemented with the remaining ink masked via an existing type of mask. This strategy can vary by color as well, with different choices made for different LUT nodes.

Figure 3:
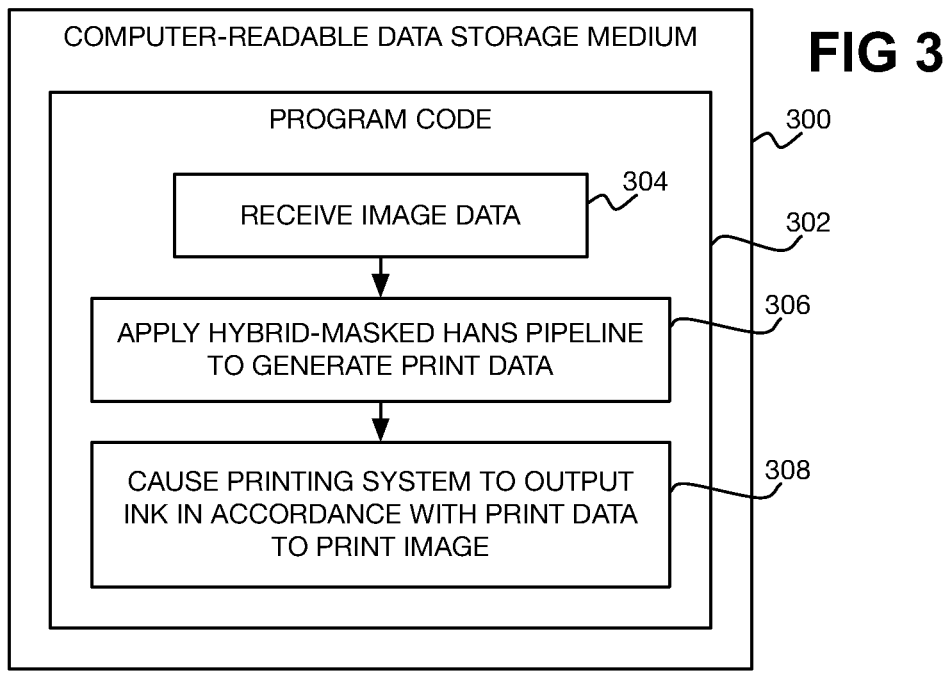
FIG. 3 is a diagram of an example non-transitory computer-readable data storage medium storing program code executable by a processor to use the HANS pipeline of FIG. 1.

FIG. 3 shows an example non-transitory computer-readable data storage medium 300 storing program code 302 executable by a processor to perform processing, such as a method. The processor may be part of a printing system, such as a printing device like a printer or a host computing device like a computer to which the printing device may be communicatively coupled (in which case the system includes both the printing device and the host computing device). The processing include receiving image data 102 for an image to be printed on media by the printing system (304), and applying a hybrid-masked HANS pipeline 100 to the image data, resulting in generation of print data 104 (306). For example, the pipeline 100 can be applied as has been described in relation to FIG. 1. The processing includes causing the printing system to output ink onto the media in accordance with the print data 104 to print the image on the media (308).

Figure 4:
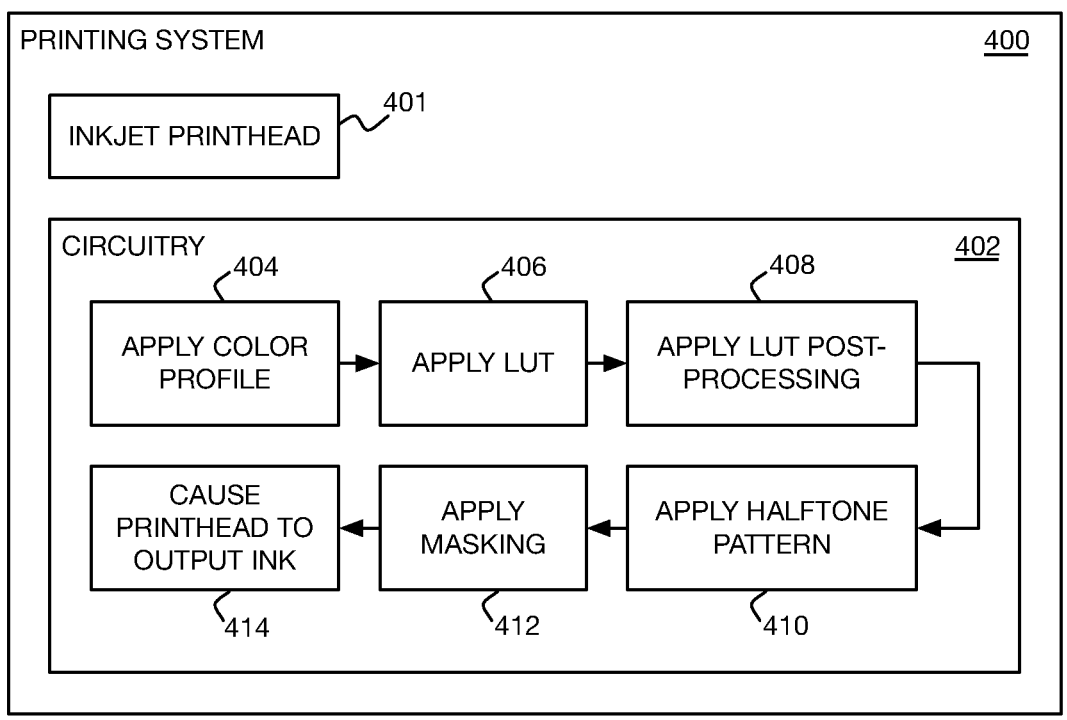
FIG. 4 is a diagram of an example printing system that uses the HANS pipeline of FIG. 1.

FIG. 4 shows an example printing system 400. The printing system 400 may be implemented as or to include a printing device such as a printer. The printing system 400 includes an inkjet printhead 401 to output ink onto media to print an image on the media. There may be more than one such printhead 401. The printing system 400 includes circuitry 402. The circuitry 402 may be considered as including a processor and memory. The processor and memory may be integrated within an application-specific integrated circuit (ASIC) in the case in which the processor is a special-purpose processor. The processor may instead be a general-purpose processor, such as a central processing unit (CPU), in which case the memory may be a separate semiconductor or other type of volatile or non-volatile memory.

The circuitry 402 applies a pre-LUT color profile 106 of a hybrid-masked HANS pipeline 100 to image data 102 for an image, resulting in corrected image data (404). The circuitry 402 applies an NPac-based LUT of the pipeline 100 to the corrected image data, resulting in NP vectors at a native resolution of the printing system (406). The circuitry 402 applies LUT post-processing 110 of the pipeline to the NP vectors at the native resolution, resulting in post-processed NP vectors at the native resolution (408). The circuitry 402 applies a halftone pattern 114 of the pipeline 100 to the post-processed NP vectors at the native resolution, resulting in halftones at the native resolution (410). The circuitry 402 applies post-halftone pattern masking 116 to the halftones, resulting in print data 104 including masked, halftoned, and post-processed NP vectors at the native resolution (412). The circuitry 402 causes the inkjet printhead 401 to output the ink onto the media in accordance with the print data (414).

In both FIGS. 3, and 4, the hybrid-masked HANS pipeline 100 has a number of NPs and employs a halftone pattern 114 selected according to specified ink interaction constraints at a native resolution of the printing system. The pipeline 100 employs an NPac-based LUT 108 and a pre-LUT color profile 106 constructed according to first specified ink coverage and usage constraints at the native resolution. The pipeline 100 employs LUT post-processing 110 (that together with the LUT 108 defines an overall LUT 112) and post-halftone masking 116 determined according to second specified ink coverage and usage constraints at the native resolution.

Techniques have been described for constructing a hybrid-masked HANS pipeline 100 that when applied to image data 102 for an image results in generation of print data 104 for the image that in accordance with which ink may be output onto media to print the image at maximum image quality without unduly sacrificing throughput. The pipeline 100 is constructed according to a combination of choices that together provide a high level of performance for the highest print quality modes of a printing system. The choices can more generally be individually tuned for different print modes, substrates, ink sets, and printing systems in adaptation of their specific constraints and interactions.

As to the implementation that has been described in detail above, the resulting hybrid-masked HANS pipeline 100 has been shown to result in more than 94% of print jobs having satisfactory image quality, as opposed to 50-60% of print jobs when using a non-HANS, ink-channel based pipeline with common resource generation and masking choices. In the described implementation, custom resources are constructed that favor light inks and reduce the amount of black inks, and use custom NPacs for each color LUT node such that different NPs can map to different masking strategies as well as different masks. More generally, however, the techniques described herein can be used to construct such resources of a particular pipeline 100 according to whatever specified constraints exist for a given printing system.

We claim:

1. A method for constructing a hybrid-masked halftone area Neugebauer separation (HANS) pipeline for a printing system, comprising:
    selecting a number of Neugebauer Primaries (NPs) of and a halftone pattern to employ within the pipeline according to specified ink interaction constraints during printing system ink output onto media, at a native resolution of the printing system;
    constructing an NP area coverage (NPac)-based lookup table (LUT) and a pre-LUT color profile to employ within the pipeline according to first specified ink coverage and usage constraints during the ink output, at the native resolution; and
    determining LUT post-processing and post-halftone pattern masking to employ within the pipeline according to second specified ink coverage and usage constraints during the ink output, at the native resolution.

2. The method of claim 1, further comprising:
    applying the pipeline to image data for an image, resulting in generation of print data; and
    causing the printing system to output ink onto the media in accordance with the print data to print the image on the media.

3. The method of claim 2, wherein applying the pipeline to the image data comprises:
    applying the pre-LUT color profile to the image data, resulting in corrected image data;
    applying the NPac-based LUT to the corrected image data, resulting in NP vectors at the native resolution;
    applying the LUT post-processing to the NP vectors at the native resolution, resulting in post-processed NP vectors at the native resolution;
    applying the halftone pattern to the post-processed NP vectors at the native resolution, resulting in halftones at the native resolution; and
    applying the post-halftone pattern masking to the halftones, resulting in masked, halftoned, and post-processed NP vectors at the native resolution.

4. The method of claim 1, wherein the specified ink interaction constraints, and the first specified ink coverage and usage constraints, and the second specified ink coverage and usage constraints are selected to provide a corresponding specified image quality of an image printed on the media via the ink output onto the media by the printing system.

5. The method of claim 4, wherein the specified ink interaction constraints comprise minimizing ink interactions without sacrificing grain.

6. The method of claim 5, wherein the number of NPs is selected to reduce the number of NPs in satisfaction of the specified ink interaction constraints.

7. The method of claim 6, wherein the halftone pattern is selected as a blue-noise pattern in satisfaction of the specified ink interaction constraints.

8. The method of claim 5, wherein the first specified ink coverage and usage constraints comprise favoring lighter inks over darker inks to increase ink coverage and favoring composite inks over black ink to increase the ink coverage.

9. The method of claim 8, wherein the pre-LUT color profile is constructed as an International Color Consortium (ICC) color profile favoring the composite inks over the black ink to in satisfaction of the first specified ink coverage and usage constraints.

10. The method of claim 8, wherein the second specified ink coverage and usage constraints comprise using custom NPacs for lower ink-density colors at lower ink coverage and using smoother masking ramps at the lower ink coverage.

11. The method of claim 10, wherein the LUT post-processing is determined as defining different NPs for the lower ink-density colors according to a threshold corresponding to the lower ink coverage.

12. The method of claim 11, wherein the post-halftone pattern masking is determined as defining the smoother masking ramps for the different NPs according to the threshold corresponding to the lower ink coverage.

13. A non-transitory computer-readable data storage medium storing program code executable by a processor to perform processing comprising:
   receiving image data for an image to be printed on media by a printing system;
   applying a hybrid-masked halftone area Neugebauer separation (HANS) pipeline to the image data, resulting in generation of print data; and
   causing the printing system to output ink onto the media in accordance with the print data to print the image on the media,
   wherein the pipeline has a number of Neugebauer Primaries (NPs) and employs a halftone pattern selected according to specified ink interaction constraints at a native resolution of the printing system,
   wherein the pipeline employs an NP area coverage (NPac)-based lookup table (LUT) and a pre-LUT color profile constructed according to first specified ink coverage and usage constraints at the native resolution,
   and wherein the pipeline employs LUT post-processing and post-halftone masking determined according to second specified ink coverage and usage constraints at the native resolution.

14. The non-transitory computer-readable data storage medium of claim 13, wherein applying the pipeline to the image data comprises:
   applying the pre-LUT color profile to the image data, resulting in corrected image data;
   applying the NPac-based LUT to the corrected image data to the corrected image data, resulting in NP vectors at the native resolution;
   applying the LUT post-processing to the NP vectors at the native resolution, resulting in post-processed NP vectors at the native resolution;
   applying the halftone pattern to the post-processed NP vectors at the native resolution, resulting in halftones at the native resolution; and
   applying the post-halftone pattern masking to the halftones at the native resolution, resulting in masked, halftoned, and post-processed NP vectors at the native resolution.

15. A printing system comprising:
   an inkjet printhead to output ink onto media to print an image on the media; and
   circuitry to:
      apply a pre-lookup table (LUT) color profile of a hybrid-masked Neugebauer separation (HANS) profile to image data for the image, resulting in corrected image data;
      apply a Neugebauer Primary (NP)-based LUT of the pipeline to the corrected image data, resulting in NP vectors at a native resolution of the printing system;
      apply LUT post-processing of the pipeline to the NP vectors at the native resolution, resulting in post-processed NP vectors at the native resolution;
      apply a halftone pattern of the pipeline to the post-processed NP vectors at the native resolution, resulting in halftones at the native resolution;
      apply post-halftone pattern masking to the halftones at the native resolution, resulting in print data comprising masked, halftoned, and post-processed NP vectors at the native resolution; and
      cause the inkjet printhead to output the ink onto the media in accordance with the print data,
   wherein a number of NPs and the halftone pattern of the pipeline are selected according to specified ink interaction constraints at a native resolution of the printing system,
   wherein the NPac-based LUT and the pre-LUT color profile are constructed according to first specified ink coverage and usage constraints at the native resolution,
   and wherein the LUT post-processing and the post-halftone masking are determined according to second specified ink coverage and usage constraints at the native resolution.

* * * * *